United States Patent [19]

Winski

[11] Patent Number: 5,562,403
[45] Date of Patent: Oct. 8, 1996

[54] LOAD FORMING APPARATUS AND METHODS

[76] Inventor: Ernest P. Winski, 5413 Nickels Dr., Oshkosh, Wis. 54901

[21] Appl. No.: 480,517

[22] Filed: Jun. 7, 1995

Related U.S. Application Data

[63] Continuation of Ser. No. 100,271, Aug. 2, 1993, abandoned, which is a continuation-in-part of Ser. No. 76,272, Jun. 11, 1993, abandoned, which is a continuation of Ser. No. 653,302, Feb. 11, 1991, abandoned.

[51] Int. Cl.⁶ ................................................ B65G 57/20
[52] U.S. Cl. .................... 414/799; 414/790.9; 414/791.6
[58] Field of Search ............................ 414/791.6, 791.9, 414/798.9, 798.6, 798.7, 790.9, 792.6, 799

[56] References Cited

U.S. PATENT DOCUMENTS

| | | | |
|---|---|---|---|
| 3,103,284 | 9/1963 | Hawkes | 214/6 |
| 3,157,301 | 11/1964 | McWilliams | 214/514 |
| 3,159,115 | 12/1964 | Nolan | 108/51 |
| 3,361,272 | 1/1968 | Carroll | 414/791.6 |
| 3,410,423 | 11/1968 | Brockmuller | 414/791 |
| 3,517,831 | 6/1970 | Hahn | 414/789.6 |
| 3,645,409 | 2/1972 | Sinclair | 214/6 BA |
| 3,833,132 | 9/1974 | Alduk | 214/6 G |
| 3,887,013 | 6/1975 | Helberg | 414/791 |
| 3,905,489 | 9/1975 | Berndt et al. | 414/791.9 |
| 3,917,080 | 11/1975 | Jones | 414/790.9 |
| 4,249,843 | 2/1981 | Kerr | 414/789.7 |
| 4,613,267 | 9/1986 | Mohr et al. | 414/37 |
| 4,704,060 | 11/1987 | Winski et al. | 414/907 |
| 4,708,564 | 11/1987 | Mylrea et al. | 414/791.6 |
| 4,955,782 | 9/1990 | D'Agnolo | 414/789.7 |
| 4,988,264 | 1/1991 | Winski | 414/790.4 |
| 5,066,190 | 11/1991 | D'Agnolo | 414/791.6 |

FOREIGN PATENT DOCUMENTS

| | | | |
|---|---|---|---|
| 396012 | 11/1990 | European Pat. Off. | 414/789.7 |
| 13331 | 1/1989 | Japan | 414/789.7 |

*Primary Examiner*—Karen Merritt
*Assistant Examiner*—Gregory A. Morse
*Attorney, Agent, or Firm*—Thomas D. Wilhelm; Brian R. Tumm; Wilhelm Law Service

[57] ABSTRACT

This invention is a novel load forming system, including a layer forming station, a load forming station, and a transfer vehicle for transferring to a load forming station, a layer at a time, units of material which have been formed into layers at a layer forming station. The transfer vehicle, including transfer plate and support frame, is mounted on underlying support wheels, which are preferably mounted on an underlying track whose length is generally confined within the load forming system.

29 Claims, 6 Drawing Sheets

LOAD FORMING APPARATUS AND METHODS

This application is a continuation, of application Ser. No. 08/100,271, filed Aug. 2, 1993 now abandoned which is a continuation in part of application Ser. No. 08/076,272, filed Jun. 11, 1993, now abandoned, which is a continaation of 07/653,302, filed Feb. 11, 1991, now abandoned which applications are incorporated herein by reference. Also incorporated herein by reference, for disclosure of a load forming system, are my U.S. Pat. Nos. 4,704,060 issued Nov. 3, 1987, and 4,988,264 issued Jan. 29, 1991.

FIELD OF THE INVENTION

This invention relates to palletizers and other load forming systems, and methods of forming unit loads, especially where units of material are placed on pallets or the like, e.g. for shipping or for further handling.

BACKGROUND OF THE INVENTION

The term "pallet" as used herein means a pallet or other rigid supporting structure which holds a generally planar shape while holding a layer of material and being supported by a fork lift having two spaced forks about 4–6 inches wide, as commonly used to support a load e.g. 36 inches wide, measured in a direction transverse to the direction of extension of the forks.

The term "load" refers to one or more layers of units of material which are combined together for simultaneous handling by a single handling device, such as a fork lift handling a pallet load, a platen truck for handling a unit load on a slip sheet, or a clamp truck for handling a unit load, without a slip sheet, by clamping the load between clamps positioned at the sides of the load.

In my U.S. Pat. No. 4,704,060, I teach a palletizer/load forming system including an in-feed conveyor, a layer forming station, a transfer plate, and a load forming station, all fixed in location such that units of material to be processed must be brought to the in-feed conveyor, and must be delivered to the load forming station. Typically, the units of material are received from a production line. The palletizer/load forming system, as taught therein, is advantageously used where the volume of material coming from a single production line, and/or processed through a single in-feed conveyor justifies the cost of the palletizing equipment. Production line output from more than one line can be combined in one in-feed conveyor, but at the risk of getting the material mixed up on the in-feed conveyor.

In my U.S. Pat. No. 4,988,264, I teach a depalletizing system wherein the depalletizer used is physically very similar in construction to the palletizer taught in U.S. Pat. No. 4,704,060. However, in e.g. FIGS. 1 and 3 of that teaching, I teach the concept of shuttling a plurality of pallet loads into and out of the in-feed position without necessarily emptying any particular load before shuttling in another load. I also teach distributing the depalletized units of material to a plurality of material receiving work stations.

In application Ser. No. 08/076,272, I teach in e.g. FIGS. 11A, 12, and 13, the concept of receiving material into the palletizer from a plurality of in-feed conveyors, forming it into layers at a plurality of layer forming stations, and depositing the material in layers on pallets in a plurality of load forming stations.

The '272 invention greatly improves the cost benefit of mechanizing the palletizing operation where the output of no single production line justifies palletizing equipment, but wherein a combination of production lines, if all fed through one palletizer, does justify the equipment expense.

As shown in the '272 application, the palletizer therein includes a frame superstructure (14) extending substantially the entire width of the palletizer, over all of the load forming stations (76). It would be desirable to eliminate some of the superstructure if the servicing of more than one layer forming station and more than one load forming station could be maintained.

It is an object of this invention to provide a palletizing system, including a mobile transfer vehicle for transferring the layer from the layer forming stationlto the load forming station.

It is another object to provide a palletizing system which includes more than one layer forming station or more than one load forming station, or both, wherein the mobile transfer vehicle is supported by underlying support wheels underlying the frame of the transfer vehicle.

It is a further object to provide a palletizing system wherein underlying support wheels are supported on a track at substantially ground level.

It is another object to provide such a track with a limited length, confined generally to the operating area useful for transferring layers between the layer forming stations and the load forming stations.

It is yet another object to provide a palletizing system wherein the transfer vehicle can move along the track to position the transfer plate to receive a layer from any of the layer forming stations, and to deliver a layer to any of the load forming stations.

It is an object to provide such a palletizing system wherein the transfer plate is disposed for travel along a first path in a direction having a horizontal component, to pick up a layer from a layer forming station, and to deliver a layer to a load forming station, and the underlying support wheels are disposed for travel in a second path, having a horizontal component transverse to the horizontal component of the first path.

It is yet another object to provide a palletizing system adapted to form layers of material at two or more layer forming stations, to receive layers of material at two or more load forming stations, and to transfer the layers between the layer forming stations and the load forming stations using two or more of the transfer vehicles, supported independent from one another, on corresponding two or more sets of wheels, whereby the two or more transfer vehicles can be separately controlled by the controller, and can ply one and the same track.

It is still a further object to provide a method of placing a layer on a pallet, including receiving a layer from a layer forming station onto a transfer plate carried on a supporting frame. Rolling the supporting frame, with transfer plate and layer thereon, along a substantially ground-engaging track, and thereafter transferring the layer from the transfer plate to a pallet in a load forming station.

It is finally an object to sense a layer being formed in a layer forming station, to sense the location of each of the transfer vehicles, and the assignments already given to the transfer vehicles, and to assign pick-up and delivery tasks to the transfer vehicles such that each transfer vehicle actively operates on all of the track which is not occupied at any given time by another transfer vehicle, and which cannot be reached without passing another transfer vehicle.

SUMMARY OF THE DISCLOSURE

Some of the objects are attained in a load forming system, including a load former for depositing units of material on a supporting surface a layer at a time wherein the layer comprises at least one row and wherein at least one such row comprises at least two units of material. The load former comprises a layer forming station wherein units of material are received and formed into a layer; a load forming station wherein layers of material are received and formed into a load; a controller for controlling operation of operating elements of the palletizing apparatus; and a mobile transfer vehicle for transferring a layer from the layer forming station to the load forming station. The transfer vehicle comprises a transfer carriage. The transfer carriage includes a frame having upstanding supports, a transfer plate mounted to the transfer carriage for receiving a layer from the layer forming station and transferring such layer to the load forming station, and underlying support wheels underlying the frame, and supporting the frame from substantially the level of the ground.

The load forming system preferably includes a track at substantially ground level, receiving and supporting the wheels, whereby the transfer vehicle, including the frame and the transfer plate, is mounted on the track and is moveable as a unit along the track.

In preferred embodiments, the load forming system includes at least two layer forming stations, the transfer vehicle being capable of moving along the track to position the transfer plate to receive a layer from any of the layer forming stations.

Preferably, a pusher is mounted on the mobile transfer vehicle, for pushing a layer from the respective layer forming station onto the transfer plate.

In some embodiments, the load forming system includes at least two load forming stations, for receiving layers from the transfer plate.

Preferably, the transfer plate is mounted for travel along a first path in a direction having a horizontal component, and the underlying support wheels are disposed to move the transfer vehicle along a second path, having a horizontal component transverse to the horizontal component of said first path.

In some embodiments, the load forming system comprises first and second transfer vehicles mounted on the track, each transfer vehicle being capable of traversing, at any given time, any portion of the track that can be reached without passing the other transfer vehicle.

Preferably, a pusher is mounted on each transfer vehicle, for pushing a layer from the respective layer forming station onto the respective transfer plate.

The invention further comprehends a method of forming units of material into a unit load, using a load forming system controlled by a programmed controller, the load forming system having a load forming station. The method comprises forming a layer with units of material; transferring the layer onto a mobile transfer vehicle, comprising a transfer plate, the transfer plate being mounted on a frame supported on underlying support wheels supported on a substantially ground-engaging track; moving the transfer vehicle, including the transfer plate and the layer, by driving the underlying support wheels along the track; in combination with moving the transfer vehicle along the track, aligning the layer with a load forming station, optionally including one or more layers on a load being formed; and transferring the layer from the transfer plate to the load forming station.

In some embodiments wherein the load forming system comprises at least two of either the layer forming station or the load forming station, it also comprises first and second transfer vehicles mounted on the track, each transfer vehicle being capable of traversing, at any given time, any portion of the track that can be reached without passing another transfer vehicle. In these embodiments, the method further comprises sensing the location of each transfer vehicle along the track, and generating signals indicating the location of each transfer vehicle; and receiving the sensing signals at the controller, and assigning pick-up and delivery tasks to each transfer vehicle such that each transfer vehicle actively operates, as assigned tasks by said controller, on all of the track which is not occupied at any given time by another transfer vehicle, and which can be reached without passing another transfer vehicle.

DETAILED DESCRIPTION OF THE ILLUSTRATED EMBODIMENTS

Figure 1:
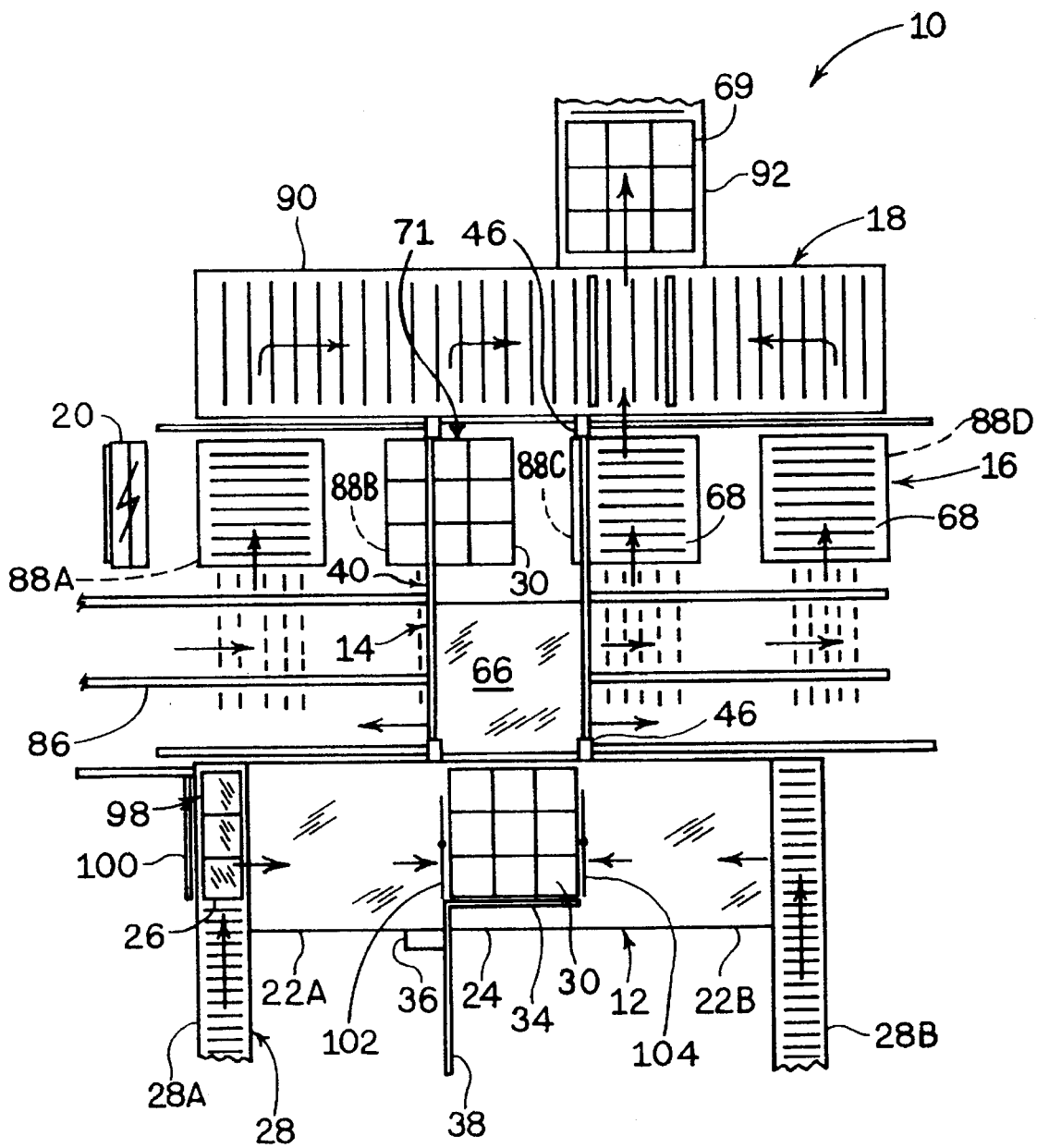
FIG. 1 is a plan view of a first embodiment of a palletizer of this invention, wherein each layer formed is conveyed to a single delivery station, showing the transfer plate in position to receive a layer from the delivery station.

The load forming system 10 of the invention comprises a layer forming subsystem 12, a layer transferring subsystem 14, a load forming subsystem 16, a load exiting subsystem 18, and a controller 20.

Figure 2:
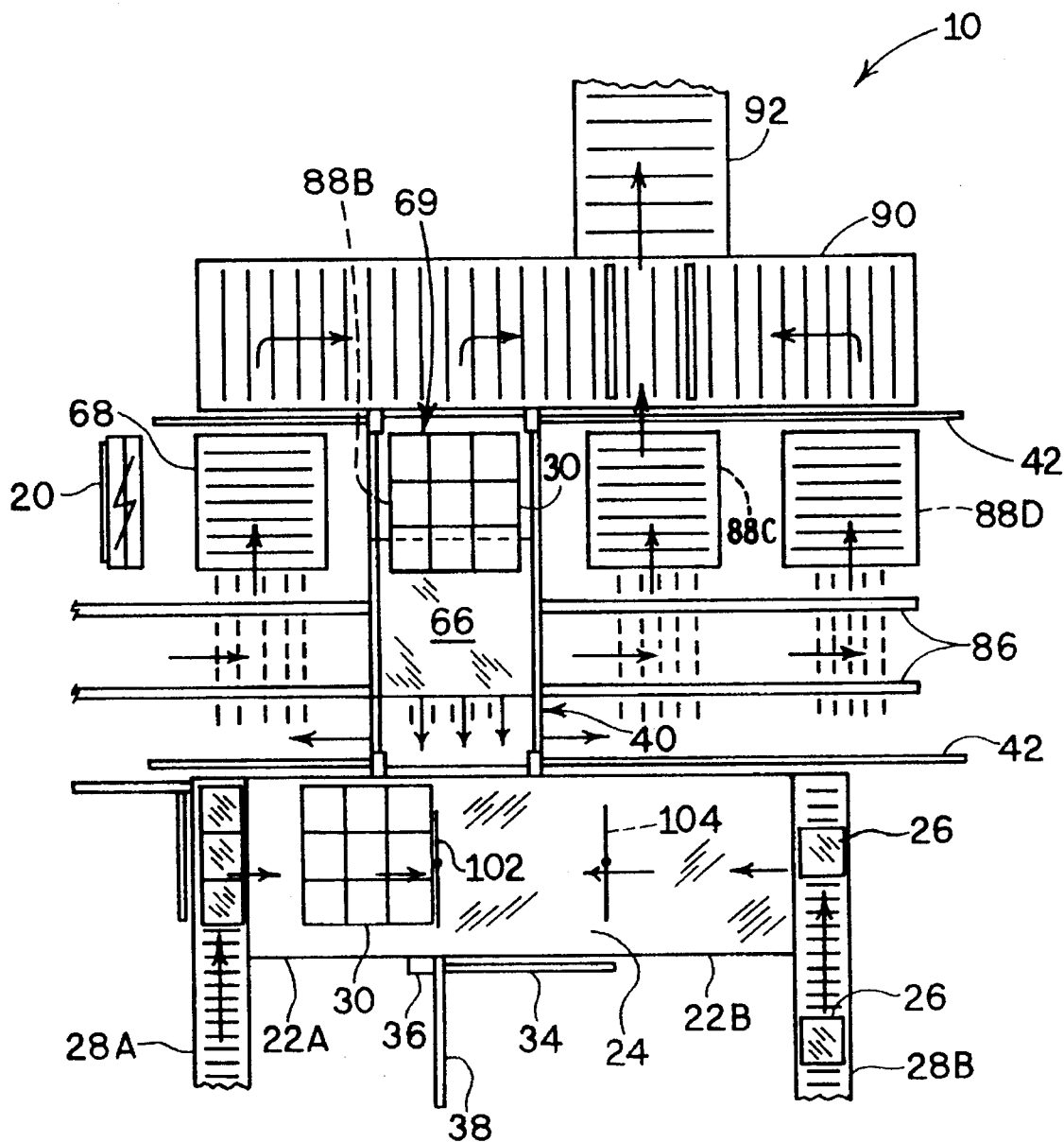
FIG. 2 is a plan view as in FIG. 1, showing the transfer plate placing a layer on a load

Referring to FIGS. 1 and 2, the layer forming subsystem 12 has two layer forming stations 22A and 22B, and a delivery station 24. Layer forming stations 22A and 22B have a composite support surface for supporting the units of material thereon while a layer is being formed and/or held there. The composite support surface typically comprises roller conveyor or the like, for underlying and supporting the units of material. The support surface of the layer forming station supports the units of material as they are received from the corresponding in-feed conveyors 28A and 28B; and the units are formed into layers 30, for example as disclosed in my U.S. Pat. No. 4,704,060. The formed layers 30 are then conveyed to delivery station 24, for example as taught in my application Ser. No. 07/653,302. From the delivery station 24, each layer 30 is pushed onto the layer transferring subsystem 14 by push arm 34, which is mounted to the layer forming subsystem 12 through mount 36, and is powered by ram 38.

Figure 5:
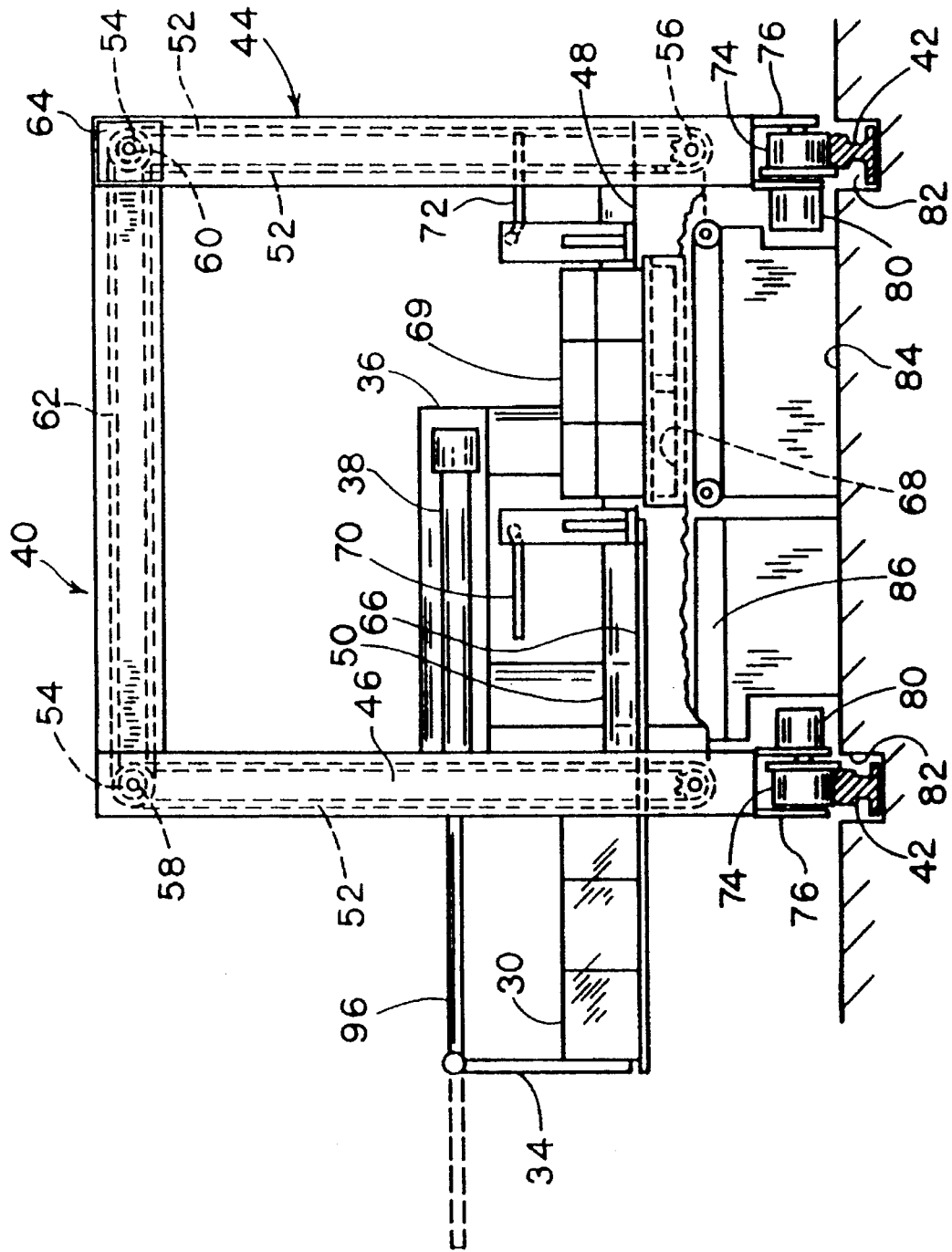
FIG. 5 is an elevation of a transfer vehicle, taken at 5—5 of FIG. 4.

Referring to FIGS. 1, 2, and 5, the layer transferring subsystem 14 comprises a mobile wheeled transfer vehicle 40, and a track 42. The wheeled transfer vehicle 40 comprises a frame 44 including four generally vertical members or posts 46 defining the corners of a rectangle. The mobile transfer vehicle 40 also comprises a generally rectangular, horizontally disposed carriage 48 having opposite first and second or right and left ends and four corners respectively connected to the four posts 46 of the frame 44 for vertical movement relative to the posts. In the illustrated construction, the carriage 48 includes first and second generally parallel, horizontal, spaced apart side guides 50. Each of the side guides 50 has an E-shaped cross-section and defines upper and lower channels opening inwardly and having opposed upper and lower generally horizontal surfaces.

The transfer vehicle 40 includes an endless vertical chain 52 mounted to each of the posts 46, and connected to the respective corners of the carriage 48 for reciprocally, vertically moving the carriage 48 relative to the frame 44. As best shown in FIG. 5, each post 46 includes an upper drive sprocket 54 and a lower idler sprocket 56. Vertical endless chain 52 is mounted around the sprockets 54 and 56. The upper sprockets 54 of the two left posts.46 (as viewed in FIG. 5) are connected by a horizontal drive shaft 58 and the upper sprockets 54 of the two right posts 46 (as viewed in FIG. 5) are connected by a horizontal drive shaft 60. Also the upper sprockets 54 of the two right posts 46 (as viewed in FIG. 5) are connected by an endless drive chain 62 to the upper sprockets 54 of the left posts 46 (as viewed in FIG. 5). Drive chain 62 is shown in FIG. 5. Drive motor 64 is connected to the drive shaft 60 to drive the two right vertical endless chains 52, and via the horizontal endless chain 62 and the drive shaft 58, the two left vertical endless chains 52. Accordingly, the four endless vertical chains 52 move in common, thereby causing common vertical movement of the four corners of the carriage 48.

Referring to FIG. 5, the wheeled transfer vehicle 40 comprises a generally horizontal transfer plate 66 mounted on the carriage 48 for reciprocal horizontal movement relative to the carriage 48 between a first or left position (as depicted in FIG. 5) wherein the transfer plate 66 is adjacent the first or left end of the carriage 48, and a second or right position wherein the transfer plate 66 is adjacent the second or right end of the carriage 48, and over a pallet 68 or other load supporting structure, or over a partially formed load 69, in the load forming subsystem 16.

The transfer plate 66 is mounted on carriage 48 by first and second pairs of wheels rotatably mounted on the sides of the transfer plate 66 and received in the upper channels of the carriage side guides 50 for rolling movement along the upper channels.

The wheeled transfer vehicle 40 further comprises means for moving the transfer plate 66 horizontally between the first or left position and the second or right position. In the preferred embodiment, the means for moving the transfer plate 66 includes, on each of the side guides 50 of the carriage 48, an endless chain extending through the upper and lower channels and connecting to the transfer plate 66. The endless chains are connected to a common drive.

The transfer vehicle 40 further includes a first restraining plate 70 mounted to carriage 48, for preventing a layer of material on the transfer plate from moving with the transfer plate 66 as the transfer plate 66 is withdrawn from the second position over the pallet/load to the first position (seen in FIG. 5).

In the illustrated construction, the first restraining plate 70 is pivotally moveable between a raised position (FIG. 5) wherein the plate 70 is parallel to the transfer plate 66, and a lowered position (not shown) wherein the first restraining plate 70 is perpendicular to the transfer plate 66.

The carriage 48 also includes a second restraining plate 72 similar to the first restraining plate 70 for restraining a layer when the transfer plate 66 is in the second or right position. Power rams (not shown) move the first and second restraining plates 70 and 72 between the raised and lowered positions.

Mobile transfer vehicle 40 is supported on track 42 by underlying support wheels 74, which support the vehicle through wheel mounts 76. Wheels 74 are driven by drive motors 80 in moving transfer vehicle 74 along track 42.

Track 42 is mounted in a recess 82 in the floor 84, such that the top of the track, and thus the bottoms of wheels 74, are slightly above the floor level, e.g. about an inch or two. The track should be high enough that the wheels do not pack debris in the recess, and preferably low enough that the track is not a significant tripping hazard. While the track can be nominally higher, that raises the height at which the handling of the units of material takes place.

As shown in the drawings, the track defines a path including a first longitudinal portion having effectively no obstructions to transport of formed layers thereabove, and corresponding to the pallet feed conveyor 86 (FIGS. 1–5). A second longitudinal portion of the path comprises the load forming subsystem 16. The mobile transfer vehicle 40 drives over both portions of this path in a first direction and a second direction opposite to the first direction (FIGS. 1–4).

In the embodiments shown, the length "L" of the track 42 (FIG. 6) is limited, and the mobility of the vehicle is accordingly limited, in that the track is confined to the working space within the load forming system 10. Thus, track 42 as illustrated is only long enough to allow movement of the mobile transfer vehicle 40 into position to pick up a layer at any layer delivery station (which may be the same location where the layer forming operation takes place) and to deliver the layer to any load forming station.

Typically, the length "L" of the track will be defined generally by the length which the transfer vehicle needs to traverse across the extension of the faces of the layer forming stations, the layer delivery stations, or the load forming stations, whichever is greater. Thus, in the embodiment of FIGS. 1 and 2, the length "L" is defined by the distance the transfer vehicle must traverse to be able to reach each of the load forming stations.

Figure 3:
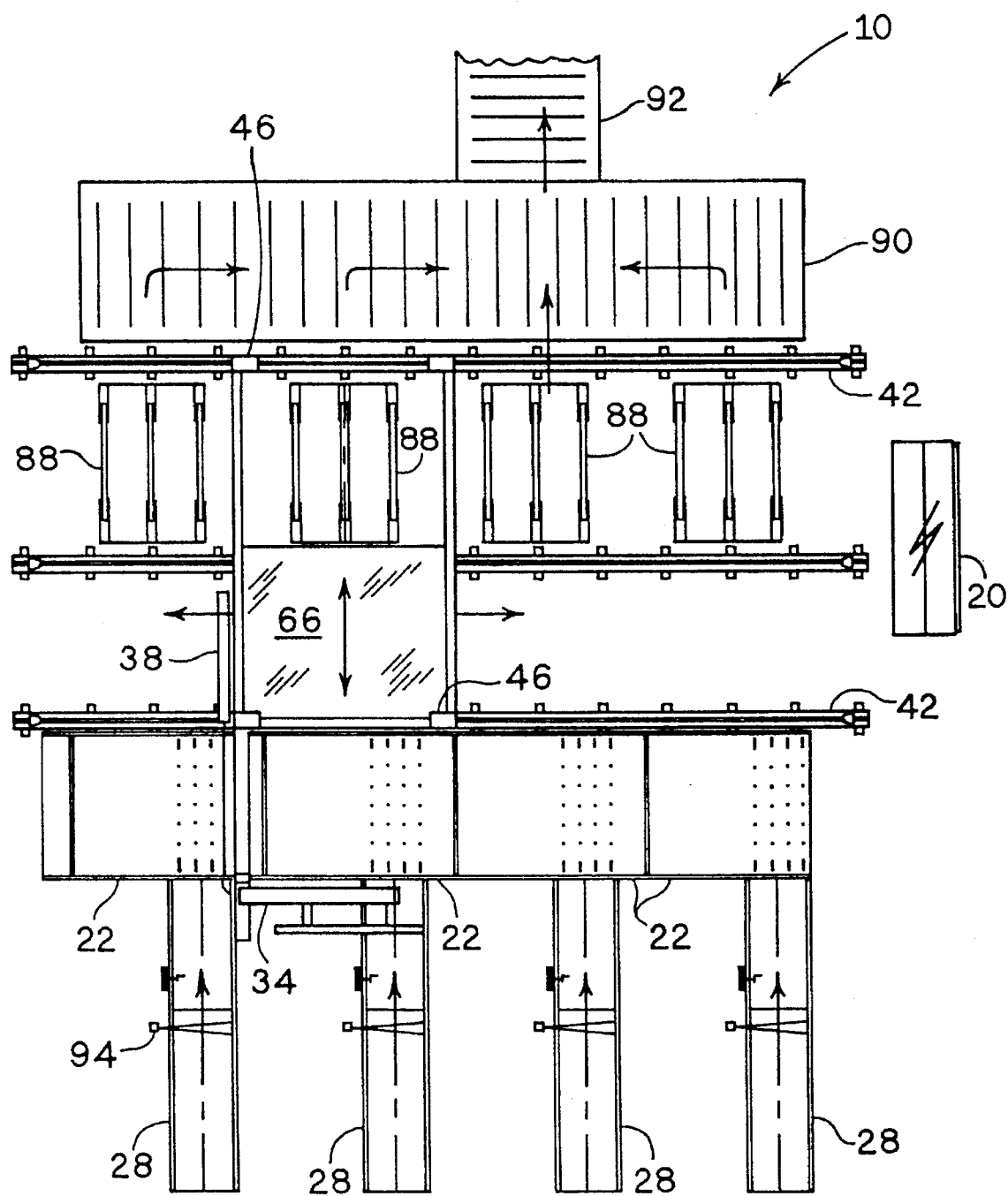
FIG. 3 is a plan view as in FIG. 1, except that each layer forming station also serves and the delivery station, for delivering the formed layer directly to the transfer plate.
Figure 4:
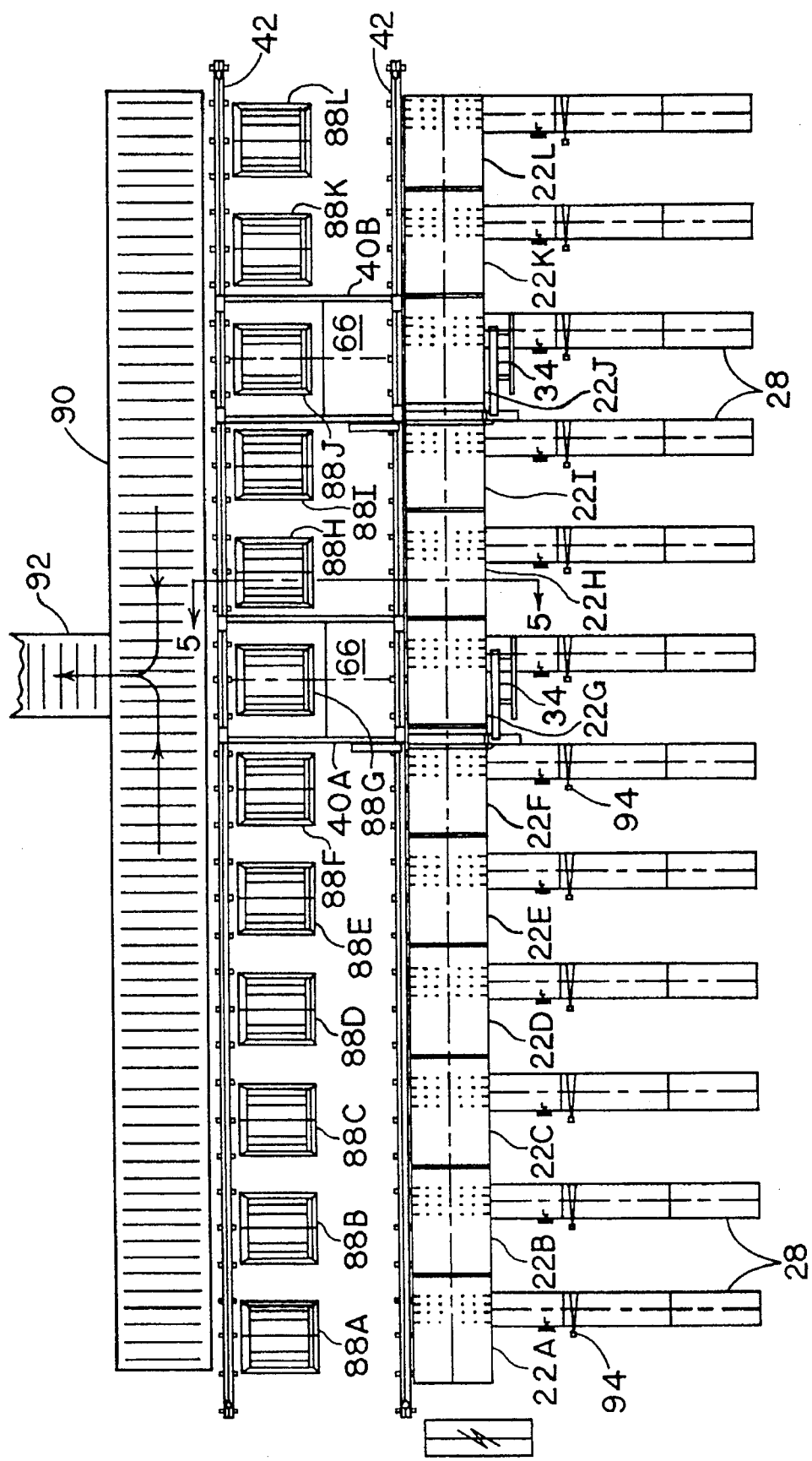
FIG. 4 is a plan view wherein the forming stations serve as delivery stations as in FIG. 3, but using two transfer vehicles.

In the embodiments of FIGS. 3 and 4, the length of the track is governed by the length across the faces of both the layer forming stations and the load forming stations, since both distances are substantially equal.

Figure 6:
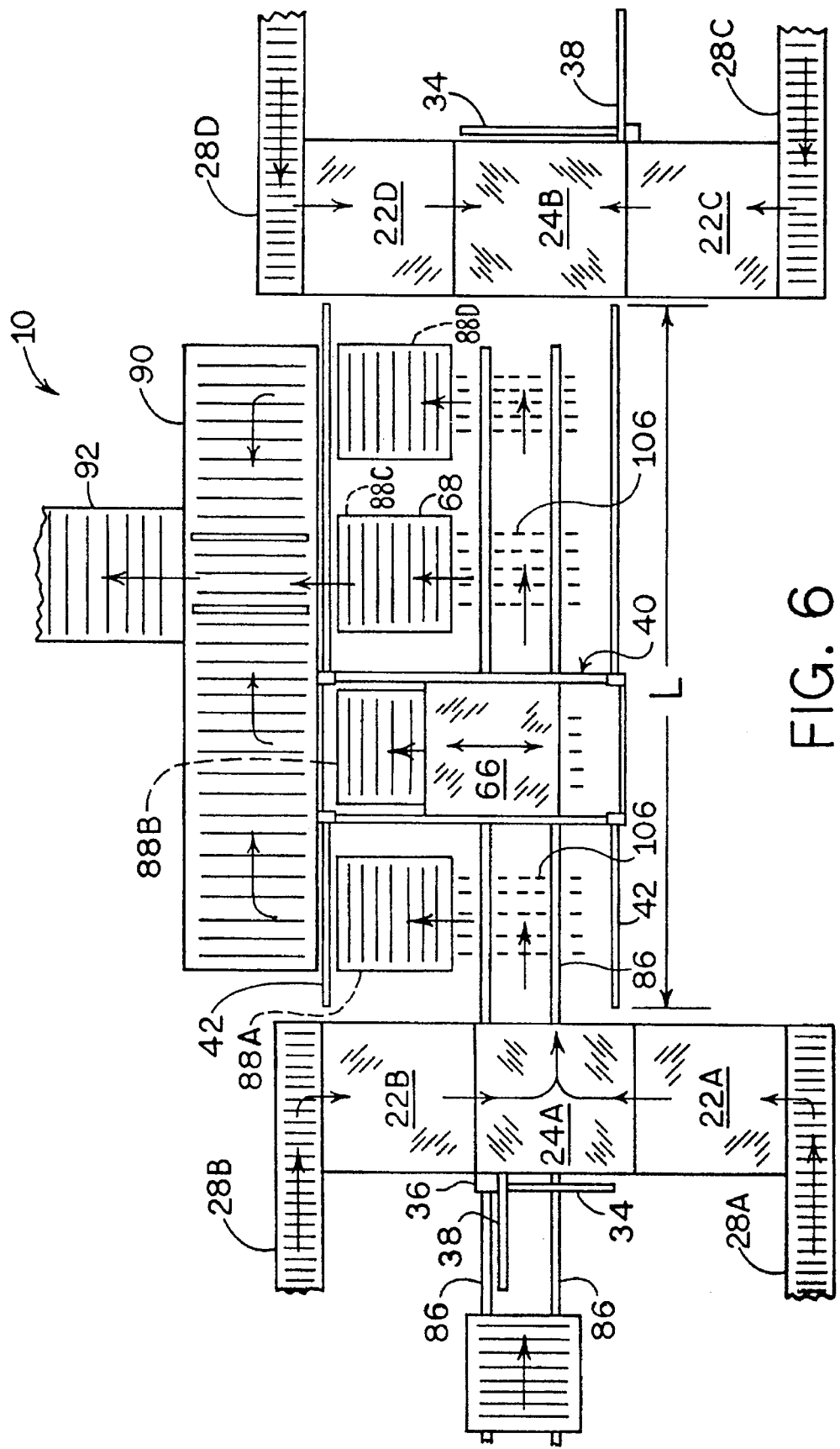
FIG. 6 is a plan view wherein, as in FIG. 1, the formed layer is conveyed from the layer forming station to a delivery station, before being delivered from there to the transfer plate, and wherein the number of delivery stations is greater than one and less than the number of layer forming stations.

In the embodiment of FIG. 6, the length of track 42 is defined by the length "L" across the faces of the load forming stations since such length also provides access to each of the layer delivery stations.

Referring now to the embodiments illustrated in FIGS. 1, 2, 5, and 6, load forming subsystem 16 includes a pallet feed conveyor 86, best shown in FIGS. 5 and 6, and pallet loading conveyors 88A–88D, which operate as load forming stations. The pallet feed conveyor 86 and pallet loading conveyors 88A–88D, are typically three strand chain conveyor, which support and transport conventional pallets. Pallet feed conveyor 86 typically has pop-up conveyor units as at 106 (FIG. 6) adjacent each load forming station to divert pallets to the pallet loading conveyors 88A–88D. The pallet in-feed conveyor 86 feeds pallets along its length to positions adjacent the pallet loading conveyors, and transfers the pallets as needed to the pallet loading conveyors 88A–88D.

Each load forming station must ultimately include support structure which is capable of supporting the units of material in the layers formed. In the illustrated embodiments, the support structure is provided in the form of pallets, which have load supporting top surfaces. In other embodiments (not shown), the support structure can take other forms. For example, the required support structure can be a conventional roller conveyor, a belt conveyor, a flat rigid plate, or even the floor underlying the load forming station. The load so formed may or may not be underlain by a conventional or other slip sheet, or other spacing sheet as taught in my U.S. Pat. No. 4,704,060. In each case, appropriate load handling apparatus is readily available to handle the unit load so formed.

Load exiting subsystem 18 includes load gathering conveyor 90 and load exit conveyor 92. Load gathering conveyor 90 receives loads, either partially formed loads 69 or fully formed loads 71, from the pallet loading conveyors 88A–88D and transports the loads to the exit conveyor 92. Partially formed loads 69 and fully formed loads 71 exit the system on load exiting conveyor 92.

Controller 20 operates to control the palletizing system 10. Through strategically placed sensors and controls, controller 20 senses the movement of material into and through the palletizing system, and controls operation of the system, and thus the movement of the units of material, and the layers and loads made with the units of material. Accordingly, the controller senses units of material 26 entering the palletizing system on in-feed conveyors 28, using photo cells 94 (FIG. 4). Sensors can likewise be used to sense a layer in a layer forming station 22, in a delivery station 24, on transfer plate 66, and at a load forming station 88, as well as to sense the top of the load. Movement of empty and loaded pallets is also sensed using sensors.

With respect to the mobile transfer vehicle, controller 20 senses the location of the transfer vehicle along track 42, based on location signals transmitted from sensors to the controller. Controller 20 also receives signals indicating the height of carriage 48 above the floor, and the horizontal location of transfer plate 66 with respect to its right and left positions.

Controller 20 is programmed, for example by an operator, with the number of units of material to be placed in a row, the number of rows in a layer, and the number of layers to be placed on a pallet to make up a pallet load.

Controller 20 uses the sensed information, the programmed instructions, and its memory of steps in process, or completed, to issue control commands to the several operating elements of the palletizing system, including assigning pick-up and delivery tasks to each of the transfer vehicles.

In FIGS. 1 and 2, formed layers are conveyed from the layer forming stations to a single layer delivery station 24. Thus, all formed layers pass through the same layer delivery station.

FIGS. 3, 4, and 5 show embodiments of the load forming system 10 wherein the transfer vehicle (e.g. transfer plate 66) receives the layers from the layer forming stations 22 where the layers were formed. Thus, in these embodiments, there is no separate layer delivery station. Rather, the layer delivery function operates directly from the respective layer forming stations.

In the embodiments (e.g. FIGS. 3–5) where a transfer vehicle 40 can receive layers from several different layer forming stations, the push arm 34, mount 36, and ram 38, are preferably mounted on the transfer vehicle, as shown in FIG. 5. As seen therein, mount 36 is mounted to carriage 48. Ram 38 is secured to mount 36. Push arm 34 is mounted for pivotal movement with respect to ram arm 96. Thus, in these embodiments, the push arm 34, mount 36, and ram 38 travel with the mobile transfer vehicle as the transfer vehicle traverses track 42.

FIG. 4 illustrates an embodiment of the load forming system 10 using two mobile transfer vehicles 40A and 40B, along a single track 42. In this embodiment, each mobile transfer vehicle has full traverse of the entire track 42, so long as the portion of the track traversed is not occupied by the other transfer vehicle. Thus, when transfer vehicle 40A is occupied transferring layers from layer forming station 22A to load forming station 88A, transfer vehicle 40B has free mobility to traverse the rest of the track 42 from layer forming station 22B and load forming station 88B to layer forming station 22L and load forming station 88L. Similarly, transfer vehicle 40A can traverse all of the track not being used by transfer vehicle 40B.

Controller 20 senses the position of each mobile transfer vehicle 40, knows the pick-up and delivery assignments previously given each transfer vehicle, and the path to be traversed by each vehicle, based on instructions already given. Controller 20 can and does keep a running computation of what areas of the track 42 thus are, and will be, available to be used by each mobile transfer vehicle at any given time. When a signal is received by controller 20 that a layer should be picked-up at one of the layer forming stations 22, or at a delivery station 24, and delivered to a designated load forming station, or one of more than one load forming stations, the controller selects the best transfer vehicle for making the pick-up and delivery, and makes the transfer assignment.

There can, of course, be more than two mobile transfer vehicles. If more than two mobile transfer vehicles are used, the same principles taught above are used to govern their operation.

FIG. 6 illustrates an embodiment of the load forming system 10 that includes the concept of a delivery station in combination with the transfer vehicle receiving layers from more than one station. Layers are formed at layer forming stations 22A and 22B, and are conveyed from there to layer delivery station 24A at one end of track 42. Layers are also formed at layer forming stations 22C and 22D, and are conveyed from there to layer delivery station 24B at the other end of track 42. Layers are pushed from the respective layer delivery stations 24A and 24B onto the transfer plate 66 when the mobile transfer vehicle 40 aligns the transfer plate with the respective layer delivery station.

The pallet loading conveyors 88A–88D can operate without pallets, as load forming stations. In such embodiments, conveyors 88A–88D are constructed of conventional roller conveyor, belt conveyor, or the like, or simply a flat surface that can support a unit load, of units of material, with or without an underlying slip sheet. Where a slip sheet is used, the resulting unit load is subsequently handled using conventional equipment for handling unit loads on slip sheets. Where no slip sheet and no pallet are used, the unit load is subsequently handled with e.g. conventional unit load clamps. Thus, wherever in this specification, or in the claims which follow, I refer to a pallet load, I include therein unit loads without a pallet, and with or without slip sheets, along with known means of handling such unit loads after the unit loads are formed.

Referring to FIGS. 1 and 2, the load forming system operates as follows. Pallets are placed in the load forming stations as needed. In the embodiment shown in FIGS. 1 and 2, a first layer 30 has already been placed on the pallet in load forming station 88B.

Units of material 26 are being received on in-feed conveyor 28A and formed into rows 98. The rows are successively pushed and conveyed onto layer forming station 22A by row pusher arm 100, optionally assisted by powered drive of conveyor rollers on the layer forming station, until a full layer is formed, abutted against vertical stop 102, which protrudes above the top of the layer support structure on the layer forming station. Controller 20 senses whether delivery station 24 is occupied by another layer. If it is, the formed layer is held in the layer forming station 22A until the delivery station 24 is emptied. When layer delivery station 24 has been emptied, stop 102 is retracted downwardly and drive rolls in layer forming station 22A and delivery station 24 are powered, driving the layer onto delivery station 24 and against erected stop 104, which operates in the same manner as stop 102. Alternatively, the layer can be pushed onto the layer delivery station 24 by push arm 100.

Transfer vehicle 40, powered by motors 80, is positioned along track 42 adjacent layer delivery station 24 (FIG. 1), with transfer plate 66 disposed at the left position (FIG. 5), and with the carriage 48 elevated to the correct height such that the layer can be pushed onto transfer plate 66. Ram 38 is activated and pusher arm 34 pushes the layer onto transfer plate 66.

The controller directs the mobile transfer vehicle, along track 42, to the proper load forming station. The transfer plate moves to its right position (FIG. 5) over the top layer of the partiully formed load 69. Carriage 48 is lowered until the transfer plate is immediately over the partiully formed load. Then restraining plates 70 and 72 are lowered to their vertical positions, restraining the layer against horizontal movement. Transfer plate 66 is then withdrawn toward the left end of the transfer vehicle (FIG. 5), depositing the layer on the underlying partiully formed load. FIG. 2 shows, with arrows, the transfer plate being so withdrawn. With the transfer plate fully withdrawn, the layer has been deposited on the load, and the mobile transfer vehicle is ready to move back to the layer delivery station to pick up the next layer.

When a sufficient munber of layers has been deposited to make a fully formed load 71, or when a partially formed layer 69 is ready to exit the palletizing system, the pallet loading conveyor 88B feeds the restective patrially formed load 69, or fully formed load 71, onto the load gathering conveyor 90. The load gathering conveyor is powered, and feeds the load to the exit conveyor 92, and out of the palletizing system.

In the embodiment of FIG. 3, the layer is held in the layer forming station until the transfer vehicle arrives to pick it up. Otherwise, the operation is essentially the same.

In the embodiment of FIGS. 4 and 5, the system includes two mobile transfer vehicles which the controller instructs individually, while assuring that it does not instruct both transfer vehicles to occupy the same location on the track at the same time.

In the embodiment of FIG. 6, the layers are formed at one or more of the layer forming stations. From the respective layer forming station, the layer is conveyed to the respective layer delivery station. The transfer vehicle then comes to the respective layer delivery station to pick up the layer. The embodiment of FIG. 6 could, of course, be used with a larger number of layer forming stations and load forming stations; wherein the layer delivery stations serve as intermediate stations between the layer forming stations and the transfer vehicle. Similarly, the layer delivery stations could be positioned at spaced locations such that they form convenient delivery locations for receiving the layers onto the mobile transfer vehicle.

Finally, the layer forming stations could be stacked vertically, and feed either directly to one or more transfer vehicle, or to one or more layer delivery stations that feed directly to the respective transfer vehicle.

In the embodiments shown, pallets 68 are fed to the load forming stations automatically, as by pallet feed conveyor 86, best seen in FIG. 6. In the alternative, the palletizing system layout can be designed such that pallets are placed in the load forming stations and/or removed therefrom manually, as with a forklift truck. In such alternative layout, each load forming station, as part of a palletizing system of this invention, thus becomes defined as a "space" on the floor, ground, etc. where a pallet is placed for loading in cooperation with the remaining elements of the system.

The arrows in FIGS. 1, 2, and 6 are especially instructive as to the flow of units of material 26, rows 98, layers 30, partially formed pallet loads 69 and fully formed pallet loads 71 into, through, and out of the palletizing system 10. Units of material arrive on the in-feed conveyors 28 and are typically formed into rows 98 on the in-feed conveyors. The rows are formed into layers 30 in the layer forming stations. Each layer is then either transferred directly as a layer to the transfer plate, or to a layer delivery station from whence the layer is transferred as a layer to the transfer plate. From the transfer plate, the layer is transported to a selected load forming station 88, and deposited on the pallet 68 a partoally formed load 69 in that load forming station. When the desired number of layers 30 has been deposited on the respective load/pallet, the load is fully formed as at 71, and ready to begin its exit of the system. The load is conveyed from the load forming station onto load gathering conveyor 90, conveyed to exit conveyor 92, and thence out of the palletizing system.

The above embodiments have generally described the invention with respect to building loads of material on pallets. Loads can just as well be built on slip sheets, or without slip sheets or pallets, and on some supporting surface that adequately supports the load. Thus, a load can be built on the floor, or other surface, in the load forming station. Such load is typically called a "unit load." The primary difference between a "unit load" and a load formed on a pallet is the method of handling the load after the load is formed. Methods for handling "unit loads" are well known, and so are not further described here.

Wherever herein I refer to the "ground" or the "floor," I include the floor at any level in a building. Thus, I include the floor at the second, or higher level/story therein.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A load forming system for depositing units of material on a supporting surface a layer at a time, said load forming system comprising:

(a) a layer forming subsystem adapted to receive a plurality of units of material and to form the plurality of units of material into a layer;

(b) a load forming subsystem having at least one load forming station wherein the layer of material is received by said supporting surface and incorporated into a load; and (c) a layer transferring subsystem comprising at least one mobile transfer vehicle including a frame, said at least one mobile transfer vehicle receiving the layer formed in said layer forming subsystem while said mobile transfer vehicle is positioned at a location adjacent said load forming subsystem, said mobile transfer vehicle being movable along a path divided into at least first and second longitudinal portions, said first longitudinal portion of said path having effectively no obstructions to transport of formed layers therealong, and said second longitudinal portion of said path including said load forming subsystem, said at least one mobile transfer vehicle being adapted to traverse said path with the layer in the first portion of said path for at least part of the traverse to a position adjacent a respective one of said at least one load forming station and to move the layer transversely relative to said first longitudinal portion ann into said second longitudinal portion of the path, to a position overlying said at least one load forming station to deposit the layer from said at least one mobile transfer vehicle onto said supporting surface of said at least one load forming station.

2. A load forming system as in claim 1, and including a track at substantially ground level, receiving and supporting wheels, said wheels supporting said frame, whereby said transfer vehicle, including said frame and a transfer plate, is mounted on said track and is moveable as a unit upon said track along said path.

3. A load forming system as in claim 2 wherein said layer forming subsystem includes at least two layer forming stations, said mobile transfer vehicle being capable of moving along the path and positioning said transfer plate to receive a layer from any of said layer forming stations.

4. A load forming system as in claim 3 wherein said at least one mobile transfer vehicle further comprises a carriage mounted to said frame, said transfer plate mounted to said carriage, and a pusher mounted on said mobile transfer vehicle, for pushing a layer from said layer forming subsystem onto said transfer plate.

5. A load forming system as in claim 4 wherein said at least one mobile transfer vehicle comprises a first mobile transfer vehicle, and a second mobile transfer vehicle mounted on said track, each said mobile transfer vehicle being capable of traversing, at any given time, any portion of said track that can be reached without passing another said transfer vehicle.

6. A load forming system as in claim 3 wherein said transfer plate is mounted on said at least one mobile transfer vehicle, and moves the layer in a substantially horizontal direction transverse to the path and over said supporting surface.

7. A load forming system as in claim 2 wherein said at least one mobile transfer vehicle comprises a first mobile transfer vehicle, and a second mobile transfer vehicle mounted on said track, each said mobile transfer vehicle being capable of traversing, at any given time, any portion of said track that can be reached without passing another said transfer vehicle.

8. A load forming system as in claim 7, and including a pusher mounted on each said transfer vehicle, for pushing a layer from the respective said layer forming subsystem onto the respective said transfer vehicle.

9. A load forming system as in claim 1 wherein said layer forming subsystem includes at least two layer forming stations, said mobile transfer vehicle being capable of moving along the path to position a transfer plate to receive a layer from any of said layer forming stations.

10. A load forming system as in claim 9 wherein said at least one mobile transfer vehicle further comprises a carriage mounted to said frame, said transfer plate mounted to said carriage, and a pusher mounted on said at least one mobile transfer vehicle, for pushing a layer from said layer forming subsystem onto said transfer plate.

11. A load forming system as in claim 1 wherein said first longitudinal portion of said path includes a pallet feed conveyor, said feed conveyor not restricting any movement of said at least one mobile transfer vehicle under any operating circumstances.

12. A load forming system as in claim 1, wherein said frame of said at least one mobile transfer vehicle is supported by wheels.

13. A method of forming units of material into a unit load, using a load forming system, the load forming system having a load forming station, said method comprising:

(a) forming a layer with the units of material;

(b) transferring said layer onto a mobile transfer vehicle while the mobile transfer vehicle is positioned at a location adjacent the load forming station, the mobile transfer vehicle comprising a frame, and wheels supporting the frame;

(c) after transferring the layer onto the mobile transfer vehicle as in subparagraph (b), moving the transfer vehicle, with the layer thereon, by driving the transfer vehicle in a first direction along a path toward the load forming station, the path allowing the mobile transfer vehicle to move only in the first direction and a second direction opposite to the first direction;

(d) in combination with moving the transfer vehicle along the path, aligning the layer adjacent the load forming station; and (e) transferring the layer from the transfer vehicle to the load forming station, by moving the layer in a third direction transverse to the path.

14. A method as in claim 13, the load forming system comprising a controller, at least one layer forming station, and at least two of at least one of layer forming station and the load forming station, said transfer vehicle comprising a first transfer vehicle, and including a second said transfer vehicle mounted on said path, each said transfer vehicle being capable of traversing, at any given time, any portion of the path that can be reached without passing another said transfer vehicle, the method further comprising:

(f) sensing the location of each said transfer vehicle along the path, and generating signals indicating the location of each said transfer vehicle so sensed; and (g) receiving the sensing signals at the controller, and assigning pick-up and delivery tasks to each said transfer vehicle such that each said transfer vehicle actively operates, as assigned tasks by the controller, on all of the path which can be reached at any given time without encountering another said transfer vehicle.

15. A method as in claim 13, the load forming system comprising at least one layer forming station, and at least two of at least one of the layer forming station and the load forming station, the transfer vehicle comprising a first transfer vehicle, and including a second said transfer vehicle mounted on the path, each said transfer vehicle being capable of traversing at any given time any portion of the path that can be reached without passing another said transfer vehicle, the method further comprising:

(f) programming a controller such that, upon receipt of a layer formed signal, and wherein the signal identifies the respective layer, the controller can select an appropriate load forming station to receive the respective layer;

(g) when a layer is formed, generating and transmitting to the controller a layer formed signal indicating that a layer is formed, the signal identifying the respective layer, whereupon the controller selects an appropriate load forming station to receive the respective layer;

(h) sensing the location of each said transfer vehicle along the path and thereby generating transfer vehicle location signals indicating the location of each said transfer vehicle, and transmitting the vehicle location signals to the controller; and (i) based on the layer formed signal, the transfer vehicle location signals, and assignments previously given to said at least two transfer vehicles, assigning pick-up and delivery tasks to each said transfer vehicle for picking up and delivering the layers so formed, such that each said transfer vehicle actively operates, as assigned tasks by the controller, on all of the path which can be reached at any given time without encountering another said transfer vehicle.

16. A load forming system for depositing units of material on a supporting surface a layer at a time, said load forming system comprising:

(a) a layer forming subsystem having at least first and second layer forming stations, each adapted to receive a plurality of units of material and to form the plurality of units of material into layers;

(b) a layer transfer subsystem including at least one mobile transfer vehicle adapted to receive layers from said layer forming subsystem, said at least one mobile transfer vehicle comprising a frame, and wheels supporting said frame; and (c) a load forming subsystem comprising said supporting surface for receiving layers from said layer transfer subsystem, said at least one mobile transfer vehicle being configured to receive the layers from said layer forming subsystem while said at least one mobile transfer vehicle is positioned at a location displaced from a said supporting surface, to traverse a path, with the layer on said mobile transfer vehicle, to the respective said supporting surface and to deposit the layer on the respective said supporting surface by moving said layer in a direction transverse to said path, whereby layers formed in said layer forming stations are subsequently transferred to said transfar vehicle, and through traverse of said transfer vehicle along the path, to the respective said supporting surface.

17. A load forming system as in claim 16 wherein said path confines said at least one mobile transfer vehicle to movement in a first direction and a second direction opposite to said first direction.

18. A load forming system as in claim 17, and including a track at substantially ground level receiving and supporting said wheels, said at least one mobile transfer vehicle, including said frame and a transfer plate, being mounted on said track and being moveable as a unit along said path in both said first and second directions.

19. A load forming system as in claim 18, wherein said at least one mobile transfer vehicle comprises a first mobile transfer vehicle, and including a second mobile transfer vehicle mounted on said track, each said mobile transfer vehicle being capable of traversing, at any given time, any portion of said track that can be reached without passing another said mobile transfer vehicle.

20. A load forming system as in claim 17, said layer forming subsystem being adjacent said layer transfer subsystem and said layer transfer system being adjacent said load forming subsystem.

21. A load forming system as in claim 17, said layer transfer subsystem being positioned between said layer forming subsystem and said load forming subsystem.

22. A load forming system as in claim 17, said at least one mobile transfer vehicle further comprising a carriage mounted to said frame, and a transfer plate mounted to said carriage, said transfer plate moving the layer onto the supporting surface in the direction transverse to said path.

23. A load forming system as in claim 16, and including a track at substantially ground level receiving and supporting said wheels, said at least one mobile transfer vehicle, including said frame and a transfer plate, being mounted on said track and being moveable as a unit along said path.

24. A load forming system as in claim 23, said at least one mobile transfer vehicle comprising a first mobile transfer vehicle, and including a second mobile transfer vehicle mounted on said track, each said mobile transfer vehicle being capable of traversing, at any given time, any portion of said track that can be reached without passing another said mobile transfer vehicle.

25. A load forming system as in claim 16, said at least one mobile transfer vehicle further comprising a carriage mounted to said frame, and a transfer plate mounted to said carriage, said transfer plate moving the layer onto the supporting surface in the direction transverse to said path.

26. A load forming system as in claim 25, and including a pusher mounted on said at least one mobile transfer vehicle, for pushing a layer from said layer forming subsystem onto the transfer plate.

27. A load forming system for depositing units of material on a supporting surface a layer at a time, said load forming system comprising:

(a) a layer forming subsystem adapted to receive a plurality of units of material and to form the plurality of units of material into a layer;

(b) a load forming subsystem having at least one load forming station wherein the layer of material is received by said supporting surface and incorporated into a load, at least one of said layer forming subsystem and said load forming subsystem comprising more than one layer forming station or more than one load forming station; and (c) a layer transferring subsystem comprising at least one mobile transfer vehicle including a frame, said mobile transfer vehicle being movable along a path divided into at least first and second longitudinal portions, to position said mobile transfer vehicle adjacent selected ones of at least one of said layer forming station and said load forming station, said first longitudinal portion of said path having effectively no obstructions to transport of formed layers therealong, and said second longitudinal portion of said path including said load forming subsystem, said at least one mobile transfer vehicle receiving the layer formed in a respective said layer forming station in the first longitudinal portion of said path, moving the layer transversely relative to said first longitudinal portion and into said second longitudinal portion of the path, thereby positioning the layer to overlie a respective said load forming station, and depositing the layer from said at least one mobile nransfer vehicle onto said supporting surface of the respective said load forming station.

28. A load forming system as in claim 27, and including a track at substantially ground level, receiving and supporting wheels, said wheels supporting said frame, whereby said transfer vehicle, including said frame and a transfer plate, is mounted on said track and is moveable as a unit upon said track along said path.

29. A load forming system as in claim 27 wherein said at least one mobile transfer vehicle further comprises a carriage mounted to said frame, a transfer plate mounted to said carriage, and a pusher mounted on said at least one mobile transfer vehicle, for pushing a layer from said layer forming subsystem onto said transfer plate.

* * * * *